United States Patent
Nagase et al.

(10) Patent No.: US 8,228,471 B2
(45) Date of Patent: Jul. 24, 2012

(54) LIQUID CRYSTAL PANEL AND LIQUID CRYSTAL DISPLAY

(75) Inventors: Junichi Nagase, Ibaraki (JP); Kentarou Takeda, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 538 days.

(21) Appl. No.: 12/521,269

(22) PCT Filed: Dec. 4, 2007

(86) PCT No.: PCT/JP2007/073370
§ 371 (c)(1),
(2), (4) Date: Jul. 22, 2009

(87) PCT Pub. No.: WO2008/084610
PCT Pub. Date: Jul. 17, 2008

(65) Prior Publication Data
US 2010/0020279 A1    Jan. 28, 2010

(30) Foreign Application Priority Data
Jan. 9, 2007  (JP) ................ 2007-001148

(51) Int. Cl.
*G02F 1/1335*  (2006.01)
(52) U.S. Cl. ........ 349/118; 349/117; 349/119; 349/120; 349/121
(58) Field of Classification Search .................. 349/116, 349/117, 119, 120, 121
See application file for complete search history.

(56) References Cited

U.S. PATENT DOCUMENTS

| | | |
|---|---|---|
| 2004/0135949 A1 | 7/2004 | Maeda |
| 2004/0207787 A1 | 10/2004 | Nakamura et al. |
| 2006/0177607 A1* | 8/2006 | Ohmori et al. ............... 428/1.31 |
| 2007/0211199 A1* | 9/2007 | Kobayashi et al. .......... 349/117 |
| 2009/0059143 A1 | 3/2009 | Shutou et al. |
| 2011/0249226 A1* | 10/2011 | Scheffer et al. ............... 349/117 |

FOREIGN PATENT DOCUMENTS

JP    2004-206064 A    7/2004
(Continued)

OTHER PUBLICATIONS

International Search Report of PCT/JP2007/073370, Mailing Date of Jan. 22, 2008.
(Continued)

*Primary Examiner* — Huyen Ngo
(74) *Attorney, Agent, or Firm* — Westerman, Hattori, Daniels & Adrian, LLP

(57) ABSTRACT

The liquid crystal panel 1 of the present invention comprises a liquid crystal cell 2, a first polarizer 31 disposed on one surface side of the liquid crystal cell 2, a second polarizer 41 disposed on the other surface side of the liquid crystal cell 2, and first optical compensation layer 5 and second optical compensation layer 6 disposed between the first polarizer 31 and second polarizer 41, and the liquid crystal cell 2 satisfies a relationship of 0.8 Re [450]/Re [550] 1, the first optical compensation layer 5 satisfies relationships of the Nz coefficient is from 0.8 to 1.4 and 0.8 Re[450]/Re[550] 1, and the second optical compensation layer 6 satisfies relationships of $nx = ny > nz$ and 0.98 Re[450]/Re[550] 1.04. The liquid crystal panel of the present invention is hardly generated color shift when the panel is viewed from all azimuth angle directions and polar angle directions, so that the liquid crystal panel is excellent in color display characteristics.

8 Claims, 5 Drawing Sheets

FOREIGN PATENT DOCUMENTS

| | | |
|---|---|---|
| JP | 2005-37784 A | 2/2005 |
| JP | 2005-049792 A | 2/2005 |
| JP | 2006-030688 A | 2/2006 |
| JP | 2006-225626 A | 8/2006 |
| JP | 2006-317854 A | 11/2006 |
| TW | 200643492 | 12/2006 |

OTHER PUBLICATIONS

Taiwanese Office Action dated Mar. 23, 2012, issued in corresponding Taiwanese Patent Application No. 096120981, 8 pages.

* cited by examiner

LIQUID CRYSTAL PANEL AND LIQUID CRYSTAL DISPLAY

TECHNICAL FIELD

The present invention relates to a liquid crystal panel, and a liquid crystal display.

BACKGROUND ART

As liquid crystal displays, for example, in a VA mode, there have been hitherto known a transmission type liquid crystal display, a reflection type liquid crystal display, and a semi-transmission type liquid crystal display (Patent Documents 1 and 2).

A liquid crystal cell of the liquid crystal displays has two liquid crystal cell substrates, a spacer interposed between the two liquid crystal cell substrates, and a liquid crystal material injected into a gap between the two liquid crystal cell substrates (the layer made of the liquid crystal material is called a liquid crystal layer). The thickness (cell gap) of the liquid crystal layer is kept constant by the spacer.

This liquid crystal layer itself has birefringence, and generates a retardation. In order to improve a deterioration in the viewing angle resulting from the retardation, an optical compensation layer for canceling the retardation of the liquid crystal layer is set up to the liquid crystal cell, of the liquid crystal display.

As an optical compensation plate of a liquid crystal display in a VA mode, a plate obtained by laminating a positive A plate satisfying a relationship of nx>ny nz and a negative C plate satisfying a relationship of nx ny>nz is conventionally disclosed (non-patent document 1).

As an optical compensation plate of a liquid crystal display in a VA mode, a plate obtained by laminating a retardation film satisfying a relationship of nx>ny=nz and the retardation of the film becomes substantially smaller toward shorter wavelengths, and a retardation film satisfying a relationship of nx≧ny>nz and the retardation of the film becomes substantially larger toward shorter wavelengths is disclosed (Patent Document 3).

The above-mentioned conventional panels aim to improve the viewing angle (achieve high contrast). However, according to the liquid crystal panels, a sufficient improvement is not made against a problem of color shift (color change) caused when the panels are each viewed from an oblique direction thereof.

Patent Document 1: JP-A-11-242226
Patent Document 2: JP-A-2001-209065
Patent Document 3: Japanese Patent No. 3648240
Non-Patent Document 1: SID 97 DIGEST pp. 845-848

DISCLOSURE OF THE INVENTION

An object of the present invention is to provide a liquid crystal panel and a liquid crystal display wherein color shift is hardly generated even when the panel or display is viewed from all azimuth angle directions and polar angle directions.

The inventors have made eager research of causes for color shift. As a result, the inventors have paid attention to a relationship between the wavelength dispersion of the retardation of a liquid crystal cell and the wavelength dispersion of the retardation of an optical compensation layer. Thus, the inventors have found out that the color shift of a liquid crystal panel can be prevented by using an optical compensation layer exhibiting a reverse wavelength dispersive property and an optical compensation layer exhibiting a flat wavelength dispersive property in a liquid crystal cell exhibiting a reverse wavelength dispersive property.

In the present specification, the "reverse wavelength dispersive property" refers to a property exhibiting a wavelength dispersion that the retardation becomes substantially smaller toward shorter wavelengths of the light, and the "flat wavelength dispersive property" refers to a property exhibiting a wavelength dispersion that the retardation is substantially constant at each wavelength of the light.

A liquid crystal panel of the present invention comprises a liquid crystal cell, a first polarizer disposed on one surface side of the liquid crystal cell, a second polarizer disposed on the other surface side of the liquid crystal cell, and first and second optical compensation layers disposed between the first and second polarizers, and characterized in that the liquid crystal cell satisfies a relationship of $0.8<Re[450]/Re[550]<1$, the first optical compensation layer satisfies relationships of the Nz coefficient is from 0.8 to 1.4 and $0.8<Re[450]/Re[550]<1$, and the second optical compensation layer satisfies relationships of nx ny>nz and $0.98<Re[450]/Re[550]<1.04$.

Here, the Nz coefficient is calculated from an expression of the Nz coefficient=$(nx-nz)/(nx-ny)$. The $Re[\lambda]$ is calculated from an expression of the $Re[\lambda]=(nx-ny)\times d$. The nx represents the refractive index in the in-plane X axis direction (the axis direction along which the refractive index in the plane is the largest), the ny represents the refractive index in the in-plane Y axis direction (the in-plane direction orthogonal to the X axis direction), and the nz represents the refractive index in the direction orthogonal to the X axis and Y axis directions. The d represents a thickness (nm), and the $\lambda$ represents a wavelength.

In the liquid crystal panel of the present invention, color shift is hardly caused even when the panel is viewed from all azimuth angle directions and polar angle directions. Thus, the panel is excellent in color display characteristics.

As the preferable liquid crystal panel of the present invention, the first optical compensation layer is disposed between the first polarizer and the liquid crystal cell, and the second optical compensation layer is disposed between the second polarizer and the liquid crystal cell.

As the preferable liquid crystal panel of the present invention, the first polarizer is disposed on the viewing surface side of the liquid crystal cell.

Also, as the preferable liquid crystal panel of the present invention, the liquid crystal cell is in a VA mode.

Further, as the preferable liquid crystal panel of the present invention, the first optical compensation layer satisfies a relationship of nx>ny≧nz.

As the preferable liquid crystal panel of the present invention, the second optical compensation layer comprises a norbornene-based polymer.

As the preferable liquid crystal panel of the present invention, the first optical compensation layer comprises a cellulose-based polymer or a modified vinyl alcohol-based polymer.

As the cellulose-based polymer, the acetyl substitution degree "DSac" and the propionyl substitution degree "DSpr" of the polymer preferably satisfy the expression of $2.0 \leq (DSac+DSpr) \leq 3.0$ and $1.0 \leq DSpr \leq 3.0$.

The modified vinyl alcohol-based polymer is preferably a chain-form polymer having at least one of the following general formulae (I) and (II) as a repeating unit.

[chemical formula 1]

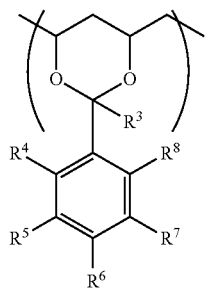

formula (I)

Here, in the general formula (I), $R^3$ represents a hydrogen atom or an alkyl group having 1 to 8 carbon atoms. $R^4$ and $R^8$ each independently represent a hydrogen atom, a linear or branched alkyl group having 1 to 4 carbon atoms, a linear or branched alkoxy group having 1 to 4 carbon atoms, a linear or branched thioalkoxy group having 1 to 4 carbon atoms, a halogen, a nitro group, an amino group, a hydroxyl group, or a thiol group (provided that $R^4$ and $R^8$ are not simultaneously hydrogen atoms). $R^5$ to $R^7$ each independently represent a hydrogen atom or a substituent.

[chemical formula 2]

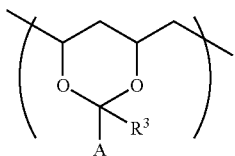

formula (II)

Here, in the general formula (II), $R^3$ represents a hydrogen atom or an alkyl group having 1 to 8 carbon atoms. A represents a naphthyl group which may have a substituent, an anthranyl group which may have a substituent, or a phenanthrenyl group which may have a substituent. One or more carbon atoms which constitute the naphthyl group, the anthranyl group or the phenanthrenyl group may be substituted, with one or more nitrogen atoms.

Also, in other aspect of the present invention, the present invention provides a liquid crystal display. The liquid crystal display comprises any one of the above-mentioned liquid crystal panels.

About the liquid crystal display comprising any one of the above-mentioned liquid crystal panels, a color display perceived when the display is viewed from an oblique direction is substantially equivalent to that perceived when the display is viewed from the front direction. Thus, the liquid crystal display is excellent in color display characteristics.

BEST MODE FOR CARRYING OUT THE INVENTION

<Construction Example of Liquid Crystal Panel>

Figure 1:
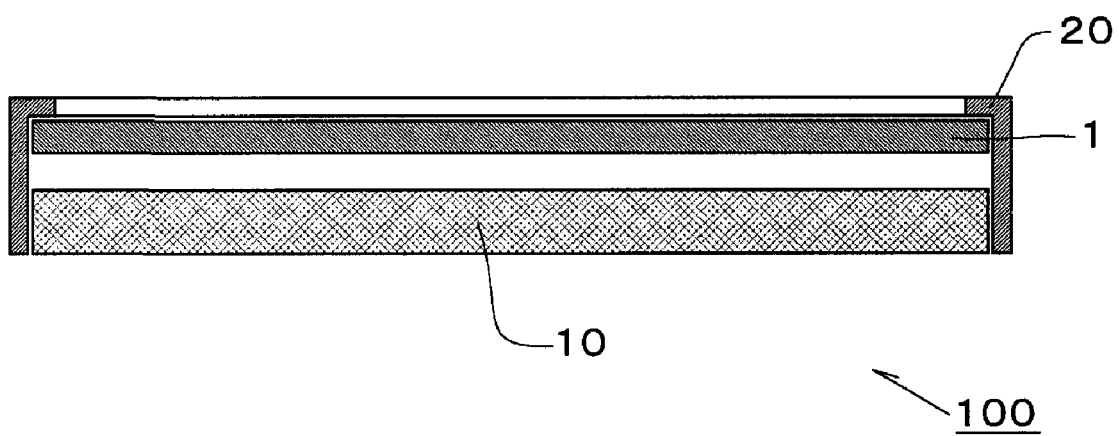
FIG. 1 is a schematic, vertical sectional view illustrating an embodiment of the liquid crystal display of the present invention.

FIG. 1 shows one example of a liquid crystal display 100 comprising a liquid crystal panel of the present invention.

The reference numeral 1 represents a liquid crystal panel, the reference numeral 10 represents a light unit disposed on the liquid crystal panel 1, and the reference numeral 20 represents a bezel disposed around the liquid crystal panel 1.

The light unit 10 is known as a back light unit disposed on the opposite viewing surface side of the liquid crystal panel 1.

The liquid crystal display can roughly be divided into a transmission type, a reflection type and a semi-transmission type by the disposition of a light source.

The liquid crystal display of transmission type is one in which a light source (a back light) is disposed on the opposite viewing surface side of the liquid crystal panel. The liquid crystal display of transmission type transmits light of this back light to perform image display. The liquid crystal display of reflection type is one in which a light source (a front light) is disposed on the viewing surface side of a liquid crystal panel, or a light source (a side light) is disposed on the screen lateral side thereof. A liquid crystal display of reflection type reflects light of the front light and the like by a reflecting plate to perform image display. Also, among the liquid crystal panels of reflection type, there is one in which a reflecting electrode is disposed on a substrate, whereby images are displayed by reflecting the light coming from a light source (external fluorescent lamp or solar light) on the viewing surface side of the liquid crystal panel. The liquid crystal panel of semi-transmission type has both of the above-mentioned transmission type and reflection type together. The liquid crystal display of semi-transmission type utilizes a light source of the back light in a dark place to perform image display, and meanwhile to reflect solar light in the light to perform image display.

FIG. 1 shows a liquid crystal display 100 of transmission type in which the back light 10 is disposed. Here, the present invention is not limited to the liquid crystal display of transmission type alone, so that it may be the liquid crystal display of the above-described reflection type or semi-transmission type (though not particularly illustrated in the drawings).

Figure 2A:
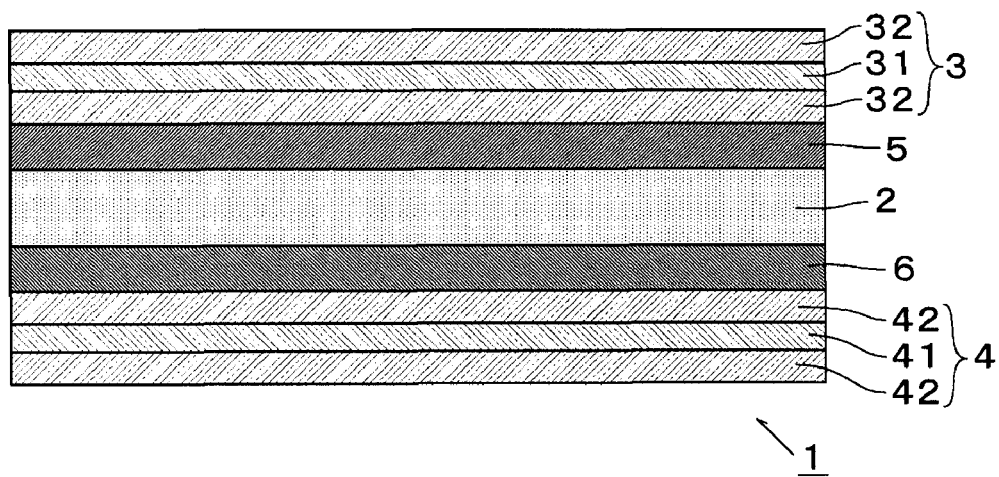
FIG. 2 is a schematic, vertical sectional view illustrating an embodiment of the layer constitution of the liquid crystal panel.
Figure 2B:
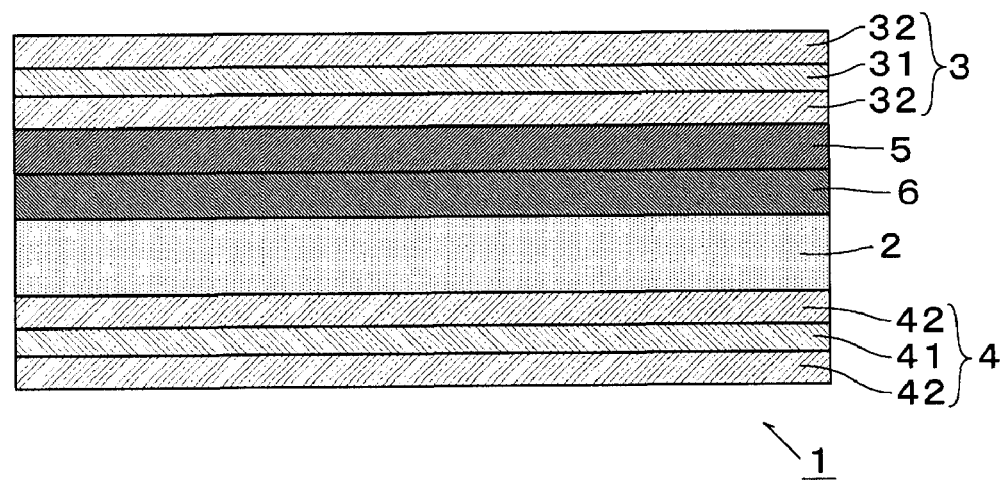

Next, FIGS. 2A and 2B show a construction example of the liquid crystal panel 1 of the present invention.

In FIG. 2A, the reference numeral 1 represents a liquid crystal panel, the reference numeral 2 represents a liquid crystal cell, and the reference numeral 3 represents a first polarizing plate disposed on the viewing surface side of the liquid crystal cell 2. This first polarizing plate 3 comprises a first polarizer 31 (a polarizer disposed on the viewing surface side) and protective films 32 and 32 laminated on both sides thereof. The reference numeral 4 represents a second polarizing plate disposed on the opposite viewing surface side of the liquid crystal cell 2. This second polarizing plate 4 comprises a second polarizer 41 (a polarizer disposed on the opposite viewing surface side) and protective films 42 and 42 laminated on both sides thereof. The reference numeral 5 represents a first optical compensation layer disposed between the first polarizing plate 3 and the liquid crystal cell 2. The reference numeral 6 represents a second optical compensation layer disposed between the second polarizing plate 4 and the liquid crystal cell 2.

Here, merely to distinguish the polarizing plates (polarizers), the optical compensation layers, or other members of the same kind from each other in the present invention, the prefixes "first" and "second" are attached thereto, but the "first" and "second" do not mean superiority, inferior, and the like.

Here, the construction of the liquid crystal panel 1 of the present invention is not limited to FIG. 2A and various changes may be made. For example, the first polarizing plate 3 may be disposed on the opposite viewing surface side of the liquid crystal cell 2 and the first optical compensation layer 5 may be disposed between the first polarizing plate 3 and the liquid crystal cell 2. In this case, the second polarizing plate 4 and the second optical compensation layer 6 are disposed on the viewing surface side of the liquid crystal cell 2.

Also, as described in FIG. 2B, the first optical compensation layer 5 and the second optical compensation layer 8 may be disposed between the first polarizing plate 3 arranged on the viewing surface side and the liquid crystal cell 2. Further, though not particularly illustrated, the first optical compensation layer 5 and the second optical compensation layer 6 may be disposed between the second polarizing plate 4 arranged on the opposite viewing surface side and the liquid crystal cell 2.

An effect of the present invention can be achieved if the first optical compensation layer 5 and the second optical compensation layer 6 are disposed between the first polarizing plate 3 and the second polarizing plate 4.

The component member of the liquid crystal panel 1 is explained sequentially as below.

Here, the terms mentioned below is defined as follows.
(1) nx, ny, nz:

The nx represents refractive index in the X axis direction (the axis direction along which the refractive index in the plane is the largest) in the plane, the ny represents refractive index in the Y axis direction (the in-plane direction orthogonal to the X axis direction) in the plane, and the nz represents refractive index in the direction orthogonal to the X axis direction and Y axis direction.
(2) Nz coefficient:

The Nz coefficient is calculated from an expression of the Nz coefficient=$(nx-nz)/(nx-ny)$. Here, in the above expression, the nx, the ny, and the nz are refractive indexes measured by light with wavelength of 550 nm at 23°C., and meaning of the nx, the ny, and the nz is same as describe above (1).
(3) Re($\lambda$):

The Re($\lambda$) means retardation value in the plane measured at 23°C. with light of wavelength $\lambda$nm. The Re($\lambda$) is calculated from an expression of the Re($\lambda$)=$(ny-ny)xd$. Here, the meaning of the nx and the ny is same as described above (1) and the d means thickness (nm).
(4) Rth($\mu$):

The Rth($\mu$) means retardation value in the thickness direction measured at 23°C. with light of wavelength nm. The Rth($\lambda$) is calculated from an expression of the Rth($\lambda$)=$(nx-nz)xd$. Here, the meaning of the nx, the ny, and the nz is same as described above (1) and the d means thickness (nm).

<About Liquid Crystal Cell>

The forms of the viewing surface of the liquid crystal cell is not particularly limited, but it is constructed in such a manner that the viewing surface (the viewing surface refers to an image displaying surface) is formed to have a rectangular shape as viewed in a front view. The ratio of the lateral and longitudinal lengths of the liquid crystal cell is not particularly limited, however the ratio is typically such that the lateral length:longitudinal length=4:3, the lateral length:longitudinal length=16:9, or the like.

The size of the viewing surface of the liquid crystal cell (namely, the viewing surface of the liquid crystal panel) is not particularly limited, so that the present invention can be applied in a wide range from those having a comparatively small viewing surface to those having a comparatively large viewing surface.

The structure of the liquid crystal cell may be adopted a conventionally known construction. For example, the liquid crystal cell comprises a pair of liquid crystal cell substrates, a spacer interposed between the liquid crystal cell substrates, a liquid crystal layer formed between the pair of liquid crystal cell substrates and having a liquid crystal material injected therein, a color filter disposed on the inner surface of the liquid crystal cell substrate on the viewing surface side, and an electrode element such as a TFT substrate for driving disposed on the inner surface of the other liquid crystal cell substrate. The color filter may have, for example, a structure wherein colorant regions in the three primary colors of red, green and blue are arranged into the form of dots between portions of a black matrix on one of the liquid crystal cell substrates. The color displaying mechanism of the liquid crystal cell of the present invention may be any one known conventionally.

The liquid crystal cell substrate is not particularly limited as long as it is excellent in transparency. The liquid crystal cell substrate, for example, includes transparent glass plates such as soda-lime glass, low-alkali borosilicate glass, and no-alkali aluminoborosilicate glass, and transparent flexible plates having flexibility, for example, optical resin plates such as polycarbonate, polymethyl methacrylate, polyethylene terephthalate and epoxy resin.

The liquid crystal material to be injected into the liquid crystal layer is not particularly limited, so that suitable ones can be selected in accordance with the liquid crystal mode. As the liquid crystal mode, for example, VA (Vertical-alignment) mode, IPS (In-Plane Switching) mode, TN (Twisted Nematic) mode, STN (Super Twisted Nematic) mode, OCB (Optically Compensated Birefringence) mode, HAN (Hybrid Aligned Nematic) mode, ASM (Axially Symmetric Aligned Microcell) mode, and the like may be cited. Among them, the liquid crystal cell in a VA mode is preferable, because awfully high contrast can be achieved.

As the liquid crystal cell in a VA mode, the long axis of the liquid crystal material is aligned approximately orthogonal to the liquid crystal cell substrates. Specifically, the liquid crystal cell in a VA mode makes liquid crystal molecules aligned in homeotropic alignment in the absence of electric field, respond to electric field in the normal direction to the substrate. About the liquid crystal cell in a VA mode in which the absorption axis of the upper polarizing plate and the lower polarizing plate are orthogonally disposed each other, when the liquid crystal cell operates according to a normally black system, liquid crystal molecules are aligned in the normal direction to the substrate in the absence of electric field, so that the screen displays in black. On the other hand, in the presence of electric field, the liquid crystal cell operates so that the liquid crystal molecules are inclined at an azimuth of 45° with respect to the absorption axis of polarizing plate, so that the transmission is increased and the screen displays in white. Here, the VA mode includes MVA (Multi-Domain Vertical Alignment). In the liquid crystal cell in a VA mode, the term "the long axis of the liquid crystal material is aligned approximately orthogonal to the liquid crystal cell substrates" means that the average value of the angles made between the long axes of the liquid crystal material in the display pixel regions and the planes of the liquid crystal cell substrates is an angle of approximately orthogonal. The angle of approximately orthogonal is 80 degrees or more, preferably 85 degrees or more, and more preferably 87 degrees or more.

The refractive index ellipsoid of the liquid crystal cell in a VA mode satisfies a relationship of nx=ny<nz. Here, the "nx=ny" includes not only the case where the nx and the ny are completely identical, but also the case where they are substantially identical. The case where the nx and the ny are substantially identical is for example the case that the Re[550] is from 0 nm to 10 nm, preferably from 0 nm to 5 nm, and more preferably from 0 nm to 3 nm.

The liquid crystal cell of the present invention exhibits such a wavelength dispersion that the retardation value becomes substantially small as the wavelength in the visible light region becomes small toward shorter wavelength (a reverse wavelength dispersive property). The wavelength dispersion of this liquid crystal cell satisfies a relationship of 0.8<Re[450]/Re[550]<1. This liquid crystal cell preferably satisfies a relationship of 0.81<Re[450]/Re[550]<0.99 and more preferably satisfies a relationship of 0.82<Re[450]/Re[550]<0.98.

The Re[550] of the above liquid crystal cell is preferably from 0 nm to 10 nm and more preferably from 0 nm to 5 nm. Also, |Rth[550]| (absolute value of the Rth[550]) is preferably from 150 nm to 500 nm, more preferably from 250 am to 450 nm, and particularly preferably from 280 nm to 420 nm.

<About Polarizing Plate (Polarizer)>

The first polarizing plate comprises a first, polarizer having a function of passing a specific linearly polarized light. The first polarizing plate is preferably such that a protective film is laminated on one surface of the first polarizer, and is particularly preferably such that a protective film is laminated on both surfaces of the first polarizer, as illustrated in FIG. 2.

The second polarizing plate comprises a second polarizer having a function of passing a specific linearly polarized light. The second polarizing plate is preferably such that a protective film is laminated on one surface of the second polarizer, and is particularly preferably such that a protective film is laminated on both surfaces of the second polarizer, as illustrated in FIG. 2.

The first polarizing plate and the second polarizing plate are disposed on the liquid crystal cell so that the absorption axis directions of the first polarizer and the second polarizer will be orthogonal to each other. For example, the first polarizer is disposed on the liquid crystal cell so that the absorption axis direction thereof will be approximately parallel to the longer side direction of the liquid crystal cell, on the other hand, the second polarizer is disposed on the liquid crystal cell so that the absorption axis direction thereof will be approximately parallel to the shorter side direction of the liquid crystal cell.

The material of the above-described polarizer is not particularly limited, but a film obtained by adsorbing a dichroic substance is preferably used. As the film, for example, a film obtained, by allowing a dichroic substance (iodine, a dichroic dye, and the like) to be adsorbed onto a hydrophilic polymer film (polyvinyl alcohol-based film, partially formulated polyvinyl alcohol-based film, ethylene-vinyl acetate copolymer-based partially saponified film, or the like) and subjected to uniaxial drawing may be cited. As the polarizer, a drawn film obtained by allowing the dichroic substance such as iodine to be adsorbed onto the hydrophilic polymer film (preferably a polyvinyl alcohol-based film) is preferable. The thickness of the polarizer is not particularly limited, however it is typically from about 5 to 80 μm.

The protective film disposed on the polarizer is preferably a film being excellent in transparency, mechanical strength, thermal stability shielding property against humidity, isotropy, and the like. Examples of the protective film include films of a polyester-based polymer such as polyethylene terephthalate or polyethylene naphthalate; cellulose-based polymer such as diacetylcellulose or triacetylcellulose; acrylic-based polymer such as polymethyl methacrylate; styrene-based polymer such as polystyrene or acrylonitrile-styrene copolymer (AS resin); polycarbonate-based polymer; and the like. Also, as the protective film, the examples include films of polyolefin-based polymer such as polyethylene, polypropylene, polyolefin having a cyclo-based or norbornene structure, or ethylene-propylene copolymer; vinyl chloride-based polymer; amide-based polymer such as nylon or aromatic poly amide; imide-based polymer; sulfone-based polymer; polyethersulfone-based polymer; polyetheretherketone-based polymer; polyphenylene sulfide-based polymer; vinyl alcohol-based polymer; vinylidene chloride-based polymer; vinyl butyral-based polymer; allylate-based polymer; polyoxymethylene-based polymer; epoxy-based polymer; the blended product of these polymers described above; and the like. The protective film can also be formed with a cured layer of thermosetting-type or ultraviolet-setting type resin such as acrylic-based, urethane-based, acrylurethane-based, epoxy-based, or silicone-based.

The protective film is preferably a cellulose-based polymer in view of the polarization property and the durability.

The thickness of the protective film can be suitably determined. Typically, in view of the operability such as strength and handling property and the thin film property, the thickness of the protective film is from about 1 to 500 μm and preferably from 5 to 200 μm.

Also, the protective film is preferably colored to the least extent. Also, a protective film having a retardation value (Rth) of −90 nm to +75 nm in the thickness direction of the film for the visible light at 23° C. is preferably used. By using a film having a retardation value (Rth) of −90 nm to +75 nm in the thickness direction, the coloring (optical coloring) of the polarizing plate due to the protective film can be almost completely eliminated. The retardation value (Rth) in the thickness direction is more preferably −80 nm to +60 nm and most preferably −70 nm to +45 nm.

As the protective film, a cellulose-based polymer film such as triacetylcellulose is particularly preferable. Here, in the case of disposing a protective film on both sides of the polarizer, it is preferable to use polymer films made of the same material as the two protective films, however different polymer films may be used as well.

The polarizer and the protective film are bonded typically through the intermediary of a water-based pressure sensitive adhesive or the like. Examples of the water-based pressure sensitive adhesive include isocyanate-based pressure sensitive adhesives, polyvinyl alcohol-based pressure sensitive adhesives, gelatin-based pressure sensitive adhesives, vinyl-based pressure sensitive adhesives, latex-based pressure sensitive adhesives, water-based polyurethane pressure sensitive adhesives, water-based polyester pressure sensitive adhesives, and the like.

On the surface of the aforesaid protective film on which the polarizer is not bonded, a hard coat, layer may be disposed, or various processes such as antireflection treatment, antisticking treatment, or treatment intended for the purpose of diffusion or antiglaring may be performed.

<About First Optical Compensation Layer>

The first, optical compensation layer is composed of a birefringence layer (also referred to as a retardation film) exhibiting predetermined retardation.

The first optical compensation layer used in the present invention exhibits such a wavelength dispersion that the retardation value becomes substantially small as the wavelength in the visible light region becomes small toward shorter wavelength (a reverse wavelength dispersive property). By using the first optical compensation layer, generation of color shift of the liquid crystal panel can be prevented.

Among the first optical compensation layers exhibiting the reverse wavelength dispersive property, the first optical compensation layer preferably satisfies a relationship of 0.8<Re[450]/Re[550]<1. The first optical compensation layer preferably satisfies a relationship of 0.81<Re[450]/Re[550]<0.99 and more preferably satisfies a relationship of 0.82<Re[450]/Re[550]<0.98.

The Re[550] of the first optical compensation layer (in-plane retardation value with wavelength of 550 nm) is preferably from 100 nm to 180 nm, more preferably from 110 nm to 160 nm, and particularly preferably from 130 nm to 150 nm.

The Rth[550] of the first optical compensation layer (retardation value in the thickness direction with wavelength of 550 nm) is preferably from 100 nm to 200 nm, more preferably from 110 nm to 190 nm, and particularly preferably from 130 nm to 180 nm.

The Rth[650] of the first optical compensation layer (retardation value in the thickness direction with wavelength of 650 nm) is preferably smaller than the Rth[650] of the second optical compensation layer. The difference between the $Rth_2$[650] of the second optical compensation layer and the $Rth_1$[650] of the first optical compensation layer ($Rth_2$[650]–$Rth_1$[650]) is preferably from 10 nm to 200 nm and more preferably from 20 nm to 190 nm.

Here, the above suffix "1" refers the first optical compensation layer and the suffix "2" refers the second optical compensation layer.

The refractive index ellipsoid of the first optical compensation layer preferably satisfies a relationship of nx>ny≧nz (nx>ny>nz or nx>ny=nz), more preferably satisfies a relationship of nx>ny=nz. Here, the "nx=ny" includes not only the case where the nx and the ny are completely identical, but also the case where they are substantially identical. The case where the nx and the ny are substantially identical includes for example the case that Re [590]–Rth[590] is from –10 nm to 10 nm, preferably from –5 nm to 5 nm, and more preferably from –3 nm to 3 nm.

The Nz coefficient of the first optical compensation layer is from 0.8 to 1.4, preferably from 0.85 to 1.15, and more preferably from 0.95 to 1.05. By using the first optical compensation layer, generation of color shift can be prevented.

Here, in the case where the Nz coefficient of the first optical compensation layer is 1.15 or 1.05, the first optical compensation layer can be classified as a positive A plate satisfying a relationship of nx>ny=nz.

The thickness of the first optical compensation layer may be set arbitrary in view of the retardation thereof and the like.

The thickness of the first optical compensation layer is generally from 30 to 150 μm, preferably from 35 to 130 μm, and more preferably from 40 to 110 μm.

Also, the first optical compensation layer may be a single layer, or composed of more than two layers if needed.

The first optical compensation layer is bonded through a known pressure sensitive adhesive as described bonding of the above polarizer.

The material of the first optical compensation layer is not particularly limited as far as the layer is a film exhibiting a reverse wavelength dispersive property. Thus, the material may be selected from, various materials. In connection with a criterion for the selection of the forming material, it is preferable to select, for example, a material exhibiting a relatively high birefringence value when the first optical compensation layer is made from the material.

The forming material of the first optical compensation layer is, for example, a non-liquid-crystal material or a liquid crystal material, and is preferably a non-liquid-crystal polymer. The non-liquid-crystal polymer can form a film having an optical uniaxiality of nx>ny on the basis of the nature of the polymer itself, which is different from, for example, liquid crystal material. When this film is subjected to drawing treatment or the like, a film having an optical biaxiality of nx>ny>nz can be obtained. Therefore, the substrate used to form the first optical compensation layer is not limited to any aligned substrate, and may be a non-aligned structure.

As specific examples of the above non-liquid-crystal material, a modified cellulose-based polymer, a modified vinyl alcohol-based polymer, and the like may be cited. A film comprising the polymer is preferable, because the film exhibits a reverse wavelength dispersive property in itself.

The cellulose-based polymer may be, for example, a cellulose-based polymer made mainly of a lower aliphatic acid ester, as described in JP-A-2002-82225, paragraphs [0106] to [0112], and others.

A cellulose-based polymer substituted with acetyl and propionyl groups may be used. About the cellulose-based polymer, the degree of the substitution with acetyl groups can be represented by the acetyl substitution degree "DSac". The "acetyl substitution degree (DSac)" is an index for representing such a degree that the three hydroxyl groups in each of repeating units of a cellulose are substituted with one or more acetyl groups on the average of the whole of the cellulose. About the cellulose-based polymer, the degree of the substitution with propionyl groups can be represented by the propionyl substitution degree "DSpr". The "propionyl substitution degree (DSpr)" is an index for representing such a degree that the three hydroxyl groups in each of repeating units of a cellulose are substituted with one or more propionyl groups on the average of the whole of the cellulose. The acetyl substitution degree "DSac" and the propionyl substitution degree "DSpr" can each be obtained by a method described in JP-A-2003-315538, paragraphs [0016] to [0019] (measuring method to which the following method is applied: a method for measuring the substitution degree of cellulose acetate by $^1$H-NMR described in A. Blumstein, J, Asrar, R. B. Blumstein, Liq. Cryst. Ordered Fluids 4, 311 (1984)).

The acetyl substitution degree "DSac" and the propionyl substitution degree "DSpr" of the cellulose-based polymer used in the present invention satisfies a relationship of 2.0≦(DSac+DSpr)≦3.0. The lower limit of DSac+DSpr is preferably 2.3 or more and more preferably 2.6 or more. The upper limit of DSac+DSpr is preferably 2.9 or less and more preferably 2.8 or less. By using the cellulose-based polymer in which DSac+DSpr is in the above range, the first optical compensation layer exhibiting desired optical characteristics as described above can be obtained efficiently.

The propionyl substitution degree "DSpr" of the cellulose-based polymer satisfies a relationship of $1.0 \leq DSpr \leq 3.0$, The lower limit of DSpr is preferably 2 or more and more preferably 2.5 or more. The upper limit of DSpr is preferably 2.9 or less and more preferably 2.8 or less. The cellulose-based polymer may have other substituents other than acetyl groups and propionyl groups. As the other substituents, for example, ester group such as butylate; ether group such as an alkyl ether group and an aralkylene ether group; and the like may be cited.

The number-average molecular weight of the cellulose-based polymer is preferably from 5,000 to 100,000, and more preferably from 10,000 to 70,000. By using the cellulose-based film having this molecular weight, a film having excellent productivity and good mechanical strength can be obtained.

The method adopted to substitute the hydroxyl group(s) with the acetyl and propionyl groups may be any appropriate method. An example thereof is a method of treating cellulose with a strong caustic soda to prepare alkaline cellulose, and acylating this cellulose with a mixture of predetermined amounts of acetic anhydride and propionic anhydride. The substitution degree "DSac+DSpr" is adjusted by hydrolyzing the acyl groups partially.

A resin composition containing the above-mentioned cellulose-based polymer, any other optional appropriate polymeric material, and additives such as a plasticizer, a thermal stabilizer, an ultraviolet stabilizer, and the like is formed into a film, and optionally the formed film is drawn to yield a film (the first optical compensation layer).

Examples of the optional appropriate polymeric material include cellulose esters such as cellulose butyrate and the like; and cellulose ethers such as methylcellulose, ethylcellulose, and the like.

In the case where the above cellulose-based polymer is used, the thickness of the film is preferably from 50 to 150 μm, more preferably from 60 μm to 140 μl, and particularly preferably from 70 to 130 μm.

Also, as the modified vinyl alcohol based polymer, for example, a chain-form polymer having at least, one of a structure represented by the following general formula (I) or general formula (II) as a repeating unit may be cited.

[chemical formula 3]

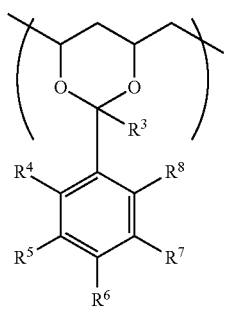

formula (I)

In the general formula (I), $R^3$ represents a hydrogen atom or an alkyl group having 1 to 8 carbon atoms. $R^4$ and $R^8$ each independently represent a hydrogen atom, a linear or branched alkyl group having 1 to 4 carbon atoms, a linear or branched alkoxy group having 1 to 4 carbon atoms, a linear or branched thioalkoxy group having 1 to 4 carbon atoms, a halogen, a nitro group, an amino group, a hydroxyl group, or a thiol group (however, $R^4$ and $R^8$ are not simultaneously hydrogen atoms). $R^5$ to $R^7$ each independently represent a hydrogen atom or a substituent.

[chemical formula 4]

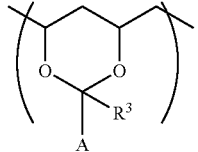

formula (II)

In the general formula (II), $R^3$ represents a hydrogen atom or an alkyl group having 1 to 8 carbon atoms. A represents a naphthyl group which may have a substituent, an anthranyl group which may have a substituent, or a phenanthrenyl group which may have a substituent. One or more carbon atoms which constitute the naphthyl group, the anthranyl group, or the phenanthrenyl group may be substituted with one or more nitrogen atoms.

A film containing a polymer (modified vinyl alcohol-based polymer) having the above repeating units exhibits a reverse wavelength dispersive property, and the film can exhibit optical biaxiality by subjecting to drawing treatment in the thickness direction.

As the preferable modified vinyl alcohol-based polymer, $R^3$ in the general formula (I) and (II) is hydrogen atom. Alternatively, as the preferable modified vinyl alcohol-based polymer, both $R^4$ and $R^8$ in the general formula (I) is not hydrogen atom, but also substituted with any one of the above substituent groups. As the more preferable modified vinyl alcohol-based polymer, $R^3$, $R^5$, and $R^7$ in the general formula (I) are hydrogen atom respectively, and R4 and R8 are alkyl group such as a methyl group or an alkoxy group.

The modified vinyl, alcohol-based polymer preferably has some other repeating unit besides the repeating unit represented by the general formula (I) or (II). The other repeating unit is, for example, a repeating unit having a hydroxyl group, or a repeating unit having an (linear, branched or cyclic) alkyl group having 1 to 12 carbon atoms.

The modified vinyl alcohol-based polymer may be obtained, for example, by causing polyvinyl alcohol to react with a specific aromatic aldehyde or aromatic ketone, thereby converting the polyvinyl alcohol to an acetal (or ketal). When an aliphatic aldehyde or the like is used together, a different repeating unit can be introduced to the polymer. By adjusting the addition amount of the reactant such as the aromatic aldehyde, the hydroxyl groups of the polyvinyl alcohol can be left. When the hydroxyl groups are left, a polymer having repeating units each having a hydroxyl group can be produced.

The polymerization degree of the modified polyvinyl alcohol-based polymer is, for example, from about 100 to 20000, and is preferably from about 500 to 10000.

Here, specific examples of a film comprising the vinyl alcohol-based polymer having the above repeating unit are described in detail in paragraphs [0060]-[0084] in Japanese Unexamined Patent Application No. 2006-65258, so that please refer to the publication (here, general formula (I) in the present specification corresponds to general formula (V) in the publication, and general formula (II) in the present specification corresponds to general formula (VI) in the publication).

The first optical compensation layer can be obtained by forming the above cellulose-based polymer, the modified vinyl alcohol-based polymer, and the like into film form and performing drawing treatment. The method of forming the film is for example, a compression molding method, a transfer molding method, an injection molding method, an extrusion molding method, a blow molding method, a powder molding method, a FRP molding method, a solvent casting method, and the like may be cited. The method of forming the film is preferably the solvent casting method or the extrusion molding method. The above-mentioned solvent casting method is a method in which for example, an enriched solution (dope) formed by dissolving a composition containing a polymer to be used as a main component and additives in a solvent is defoamed, and then casted over the surface of an endless stainless belt or a rotational drum, and the solvent is evaporated to form a film. Further, the above-mentioned extrusion molding method is a method in which for example, a composition containing a polymer to be used as a main component and additives is heated and melted, and this molten is extruded over the surface of a casting roll by using a T-die or the like, and the extruded composition is cooled to form a film. By employing the above-mentioned method, a film having excellent uniformity of thickness can be obtained.

As a method of drawing the above-mentioned film, any proper drawing method can be adopted in accordance with the purpose. Examples of the above-mentioned drawing method include a longitudinal uniaxial drawing method, a transverse uniaxial drawing method, a method of simultaneous biaxial drawing in longitudinal and transverse directions, and a method of sequential biaxial drawing in longitudinal direction and transverse direction. As a means for drawing the above-mentioned film, any proper drawing machine such as a roller drawing machine, a tenter drawing machine, and a biaxial drawing machine can be employed. These drawing machines preferably include a temperature-control means. When drawing is performed under heating, an internal temperature of the drawing machine may be continuously changed, or may be changed stepwise. A drawing process may be performed once or may be divided into two. A drawing direction may be a longitudinal direction (MD direction) of a film or a width direction (TD direction) of a film. Further, the film may be drawn in a slanting direction (diagonal drawing) by using a drawing method described in FIG. 1 in Japanese Unexamined Patent Publication No. 2003-262721.

A temperature (drawing temperature) at which the above-mentioned film is drawn can be appropriately set in accordance with the purpose. The drawing is preferably performed within a range of from −30° C. to +30° C. around a glass transition temperature (Tg) of the film. By selecting such a condition, the retardation value is easy to become uniform and an obtained film hardly crystallizes (becomes clouded). Specifically, the above-mentioned drawing temperature is preferably from 100 to 180° C. and more preferably from 120 to 160° C. Here, the glass transition temperature can be determined by a DSC method according to JIS K 7121 (1987).

A means for controlling the above-mentioned drawing temperature is not particularly limited, and examples of the above-mentioned temperature-control means include an air circulation type thermostatic oven in which hot air or cold air is circulated, a heater utilizing a microwave or far-infrared rays, a roller heated for temperature-control, a heated heat pipe roll, a heated metal belt, and the like.

A draw ratio of the above film can be appropriately selected in accordance with the purpose. The above-mentioned draw ratio is preferably more than 1 and 3 times or less, more preferably more than 1 and 2.5 times or less, and particularly preferably from 1.1 to 2.0 times.

In the case where the film comprises the modified polyvinyl alcohol-based polymer, a free end longitudinal drawing or a fixed end transverse drawing is preferably used as a drawing treatment. When the free end longitudinal drawing is performed on the film, the temperature condition is preferably from 130° C. to 170° C. and more preferably from 140° C. to 160° C. As the draw ratio, it is preferably from 1.5 to 1.9 times and more preferably from 1.6 to 1.8 times. Also, when the fixed end transverse drawing is performed on the film, the temperature condition is preferably from 120° C. to 160° C. and more preferably from 130° C. to 150° C. As the draw ratio, it is preferably from 1.6 to 2.2 times and more preferably from 1.7 to 2.0 times.

The feed speed in the drawing is not particularly limited, and is preferably from 0.5 to 30 m/minute from the viewpoint of mechanical precision, stability and the like. When the above-mentioned drawing conditions are adopted, target optical characteristics can be obtained and additionally a film excellent in uniformity can be obtained.

About, for example, the above-mentioned cellulose-based film substituted with acetyl and propionyl groups, the drawing therefor is preferably sequential biaxial drawing. When this cellulose-based film is biaxially drawn, the film is converted to a film exhibiting an optical biaxialty of nx>ny>nz. In the sequential biaxial drawing, the film is drawn in the longitudinal direction (or width direction), and then drawn in the width direction (or longitudinal direction). The drawing temperature is preferably in the range of Tg 30° C. wherein Tg represents the glass transition temperature of the cellulose-based film.

<About Second Optical Compensation Layer>

The second optical compensation layer is composed of a birefringence layer (also referred to as a retardation film) exhibiting predetermined retardation.

The second optical compensation layer used in the present invention exhibits such a wavelength dispersion that retardation with any wavelengths in visible light region is approximately constant (a flat wavelength dispersive property). By using the above first optical compensation layer and the second optical compensation layer, generation of color shift of the liquid crystal panel can be prevented.

The second optical compensation layer exhibiting the flat wavelength dispersive property satisfies a relationship of 0.98<Re[450]/Re[550]<1.04, preferably satisfies a relationship of 0.985<Re[450]/Re[550]<1.035, and more preferably satisfies a relationship of 0.99<Re[450]/Re[550]<1.03.

The Re[550] of the second optical compensation layer is preferably from 0 nm to 10 nm, more preferably from 0 nm to 5 nm, and particularly preferably from 0 nm to 3 nm.

The Rth[550] of the second optical compensation layer is preferably from 150 nm to 250 nm, more preferably from 170 nm to 230 nm, and particularly preferably from 180 nm to 220 nm.

The refractive index ellipsoid of the second optical compensation layer preferably satisfies a relationship of nx ny>nz. Here, the "nx=ny" includes not only the case where the nx and the ny are completely identical, but also the case where they are substantially identical. The case where the nx and the ny are substantially identical includes for example the case that Re [550] includes from 0 nm to 10 nm, preferably from 0 nm to 5 nm, and more preferably from 0 nm to 3 nm.

The thickness of the second optical compensation layer may be set arbitrary in view of the retardation thereof and the like. The thickness of the second optical compensation layer is generally from 2 to 200 µm, preferably from 3 to 190 µm, and more preferably from 4 to 180 µm.

Also, the second optical compensation layer may be a single layer, or composed of more than two layers if needed. The second optical compensation layer is bonded through the known pressure sensitive adhesive as described bonding of the above polarizer.

The material of the second optical compensation layer is not particularly limited as far as the layer is a film exhibiting a flat wavelength dispersive property. Thus, the material may be selected from various materials. In the present invention, the film exhibiting the flat wavelength dispersive property is, for example, a film containing a norbornene-based polymer as a main component.

Specifically, the second optical compensation layer is obtained, for example, by drawing an undrawn norbornene-based polymer film. The glass transition temperature (Tg) of the undrawn norbornene-based polymer film is, for example, from 100 to 150° C., preferably from 110 to 145° C., and more preferably from 120 to 140° C.

This norbornene-based polymer film can be produced by a generally known method, for example. Also, the norbornene-based polymer film may be a commercial production. As this commercial production, for example, an ARTON FILM (trade name)(manufactured by JSR Corporation) and the like may be cited.

<About Liquid Crystal Display>

The liquid crystal panel of the present invention can be preferably used for component member of a liquid crystal display. Construction of the liquid crystal display can be carried out in accordance with the prior art. Namely, the liquid crystal display is composed typically by suitably assembling a liquid crystal panel and component members such as an illumination system. The liquid crystal display of the present invention is not particularly limited except that the aforesaid liquid crystal panel is used, so that it can be produced according to the prior art.

The liquid crystal display of the present invention is used for arbitrary purposes. The use thereof is directed, for example, to OA appliance such as personal computer monitors, notebook personal computers, and copying machines, portable appliance such as portable phones, watches, digital cameras, portable information terminals (PDA), and portable game machines, electric appliance for home use such as video cameras, television sets, and electronic ranges, appliance for mounting on a vehicle such as back monitors, monitors for a car navigation system, and car audio apparatus, display appliance such as monitors for information for commercial stores, safeguard appliance such as supervising monitors, assisting or medical appliance such as monitors for assisting and caring seniors and monitors for medical use, and the like appliance.

EXAMPLES

Hereinafter, the present invention is further described by explaining Examples of the present, invention. Here, the present invention is not limited to the following Examples.
<Various Measurements>
(a) Measurement of Refractive Index:

The refractive index was measured by using an Abbe refractometer [trade name "DR-M4" manufactured by ATAGO Co., Ltd.] with light exhibiting wavelength of 550 nm at 23° C.

(b) Measurement of Retardation Value (Re[λ], Rth[λ]):

The retardation value was measured by using a retardation meter principled by parallel Nicol rotation method [KO-BRA21-ADH" (trade name) manufactured by Oji Scientific Instruments] at 28° C. in room temperature, (c) Measurement of Thickness:

When the thickness was less than 10 µm, a spectrophotometer for thin films [product name: ["SHUNKAN [transliteration] MULTI PHOTOMETRY SYSTEM MCPD-2000" manufactured by Otsuka Electronics Co., Ltd.] was used to measure the thickness. When the thickness was 10 µm or more, a digital micrometer "KC-351C model" manufactured by Anritsu Corporation was used to measure the thickness.

(d) Measurement of XY Chromaticity:

The XY chromaticity was plotted by using a ["EZ Contrast 160D" (trade name)] manufactured by ELDIM Co.

<Used Optical Materials>

(a) Polarizing Plates (a):

Polarizing plates (trade name: SIG 1423) manufactured by Nitto Denko Corporation were used as they were. The polarizing plates were each a member wherein a protective film (triacetylcellulose film) of 80 µm thickness was laminated onto each surface of the polarizers (iodine-dyed, drawn polyvinyl alcohol film) of 20 µm thickness.

(b) Optical Compensation Layers (1):

Optical compensation layers (trade name: KA FILM) manufactured by Kaneka Corporation were used as they were. These films were cellulose-based films of 100 µm thickness "acetyl substitution degree (DSac)=0.04, propionyl substitution degree (DSpr)=2.76". Optical characteristics thereof were follows: nx>ny=nz, Nz coefficient=1.0, Re[550]=140 nm, Rth[550]=140 nm, and Re[450]/Re[550]=0.963.

(c) Optical Compensation Layers (2):

Films (trade name: ARTON FILM) manufactured by JSR Corporation were used. The films were each a norbornene-based film. The norbornene-based films (thickness; 100 nm) were dry-drawn 1.15 times in the longitudinal direction at 175° C., and then dry-drawn 1.335 times in the width direction (direction orthogonal to the longitudinal direction) at 175° C. The resultant films were relieved to set the ratio of the longitudinal direction length thereof to the width direction length thereof to 0.975 after the drawn treatments. According to this processing, films of 75 µm thickness were yielded. The film was used as an optical compensation layer (2). Optical characteristics thereof were follows: nx=ny>nz, Re[550]≅0 nm, Rth[550]=90 nm, and Re[450]/Re[550]=1.005, here Re[550]≅0 nm means not completely equal to 0 nm but very close to 0 nm.

(d) Optical Compensation Layer (3):

A film (trade name: UR FILM) manufactured by Teijin Limited was used as it was. The film was a polycarbonate-based film of 20 µm thickness. Optical characteristics thereof were follows: nx>ny=nz, NZ coefficient=1.0, Re[550]=140 nm, Rth[550]=140 nm, and Re[450]/Re[550]=1.059.

(e) Optical Compensation Layers (4):

Films (trade name: KA FILM) manufactured by Kaneka Corporation were used as they were. The films were each a cellulose-based film of 100 µm thickness. Optical characteristics thereof were follows: nx=ny>nz; Re[550]≅0 nm, Rth [550]=110 nm, and Re[450]/Re[550]=0963, here Re[550]≅0 nm means not completely equal to 0 nm but very close to 0 nm.

(f) Liquid Crystal Cell:

Commercially available liquid crystal television (trade name: BRAVIA V2000, manufactured by Sony Corp.) was obtained, and the television was decomposed to take out a liquid crystal cell. This liquid crystal cell was in a VA mode satisfying nx=ny<nz and had the following characteristics:

Re[550]≅0 nm, Rth[550]=−320 nm, and Re[450]/Re[550]= 0.967. Here, Re[550]≅0 nm means not completely equal to 0 nm but very close to 0 nm.

Example 1

The optical compensation layer (1) was adhered onto the viewing surface side of the liquid crystal cell through an acrylic pressure-sensitive adhesive (thickness: 5 µm), and then one of the polarizing plates (a) was adhered onto one of the surfaces of the optical compensation layer (1) (the uncovered surface opposite to the surface bonded to the liquid crystal cell). Two of the optical compensation layers (2) were adhered onto the surface opposite to the viewing side surface of the liquid crystal cell through the same pressure-sensitive adhesive as described above. Another plate of the polarizing plates (a) was adhered onto the uncovered surface of the lower layer of the optical compensation layers (2) through the same pressure-sensitive adhesive.

Figure 3:
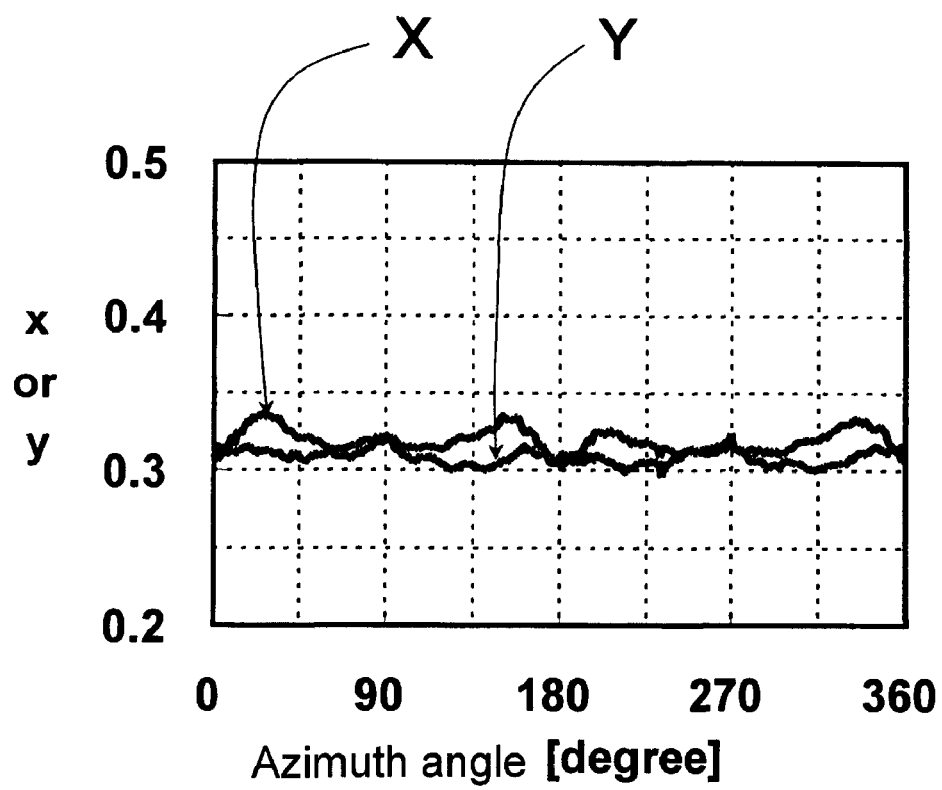
FIG. 3 is a graph showing measurement results of a change in color shift in accordance with a variation in the azimuth angle to a liquid crystal panel of Example 1.
Figure 4:
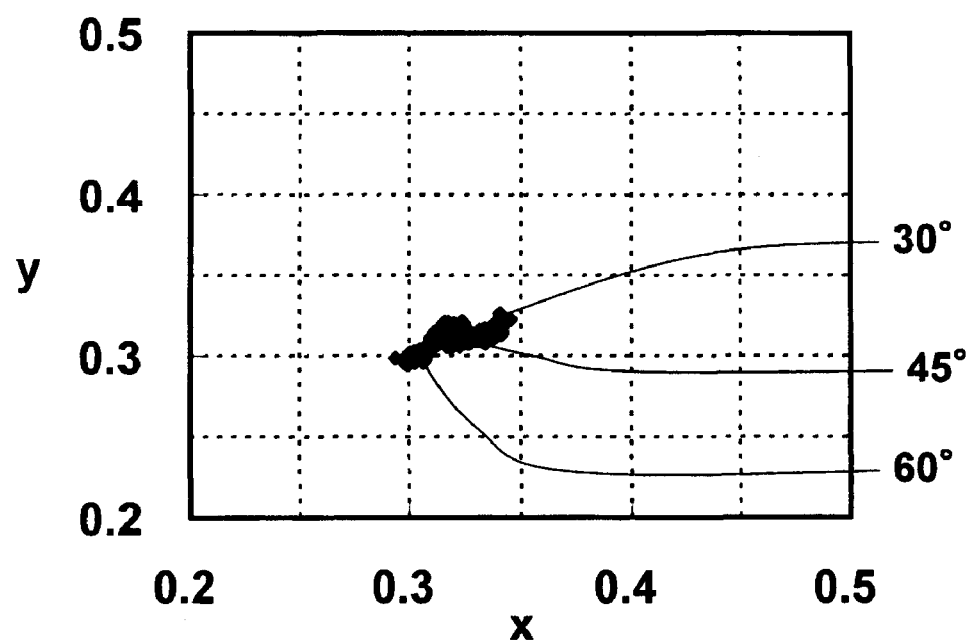
FIG. 4 is a graph showing measurement results of a change in color shift in accordance with a variation in the polar angle to the liquid crystal panel of Example 1.

About the resultant liquid crystal panel, the XY chromaticity was measured. Results as shown in FIGS. 3 and 4 were obtained. As is evident from the results, the chromaticity of the liquid crystal panel of Example 1 was a value close to 0.3, which is the most preferable value in all azimuth angles and all polar angles. Thus, it was ascertained that only a very small color shift was generated.

Figure 5:
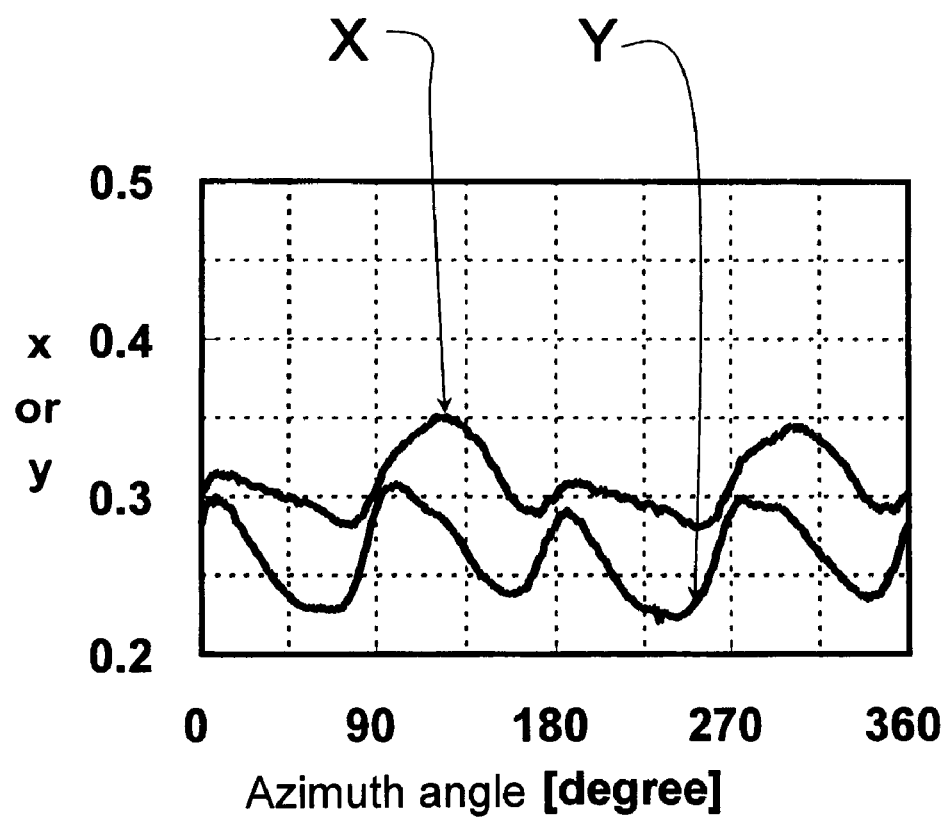
FIG. 5 is a graph showing measurement results of a change in color shift in accordance with a variation in the azimuth angle to a liquid crystal panel of Comparative Example 1.
Figure 6:
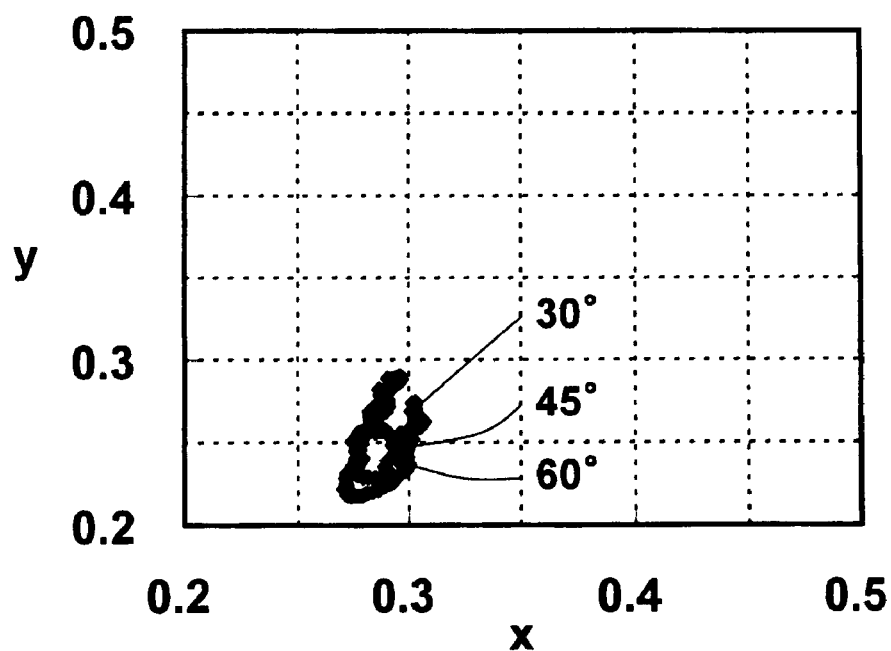
FIG. 6 is a graph showing measurement results of a change in color shift in accordance with a variation in the polar angle to the liquid crystal panel of Comparative Example 1.
Figure 7:
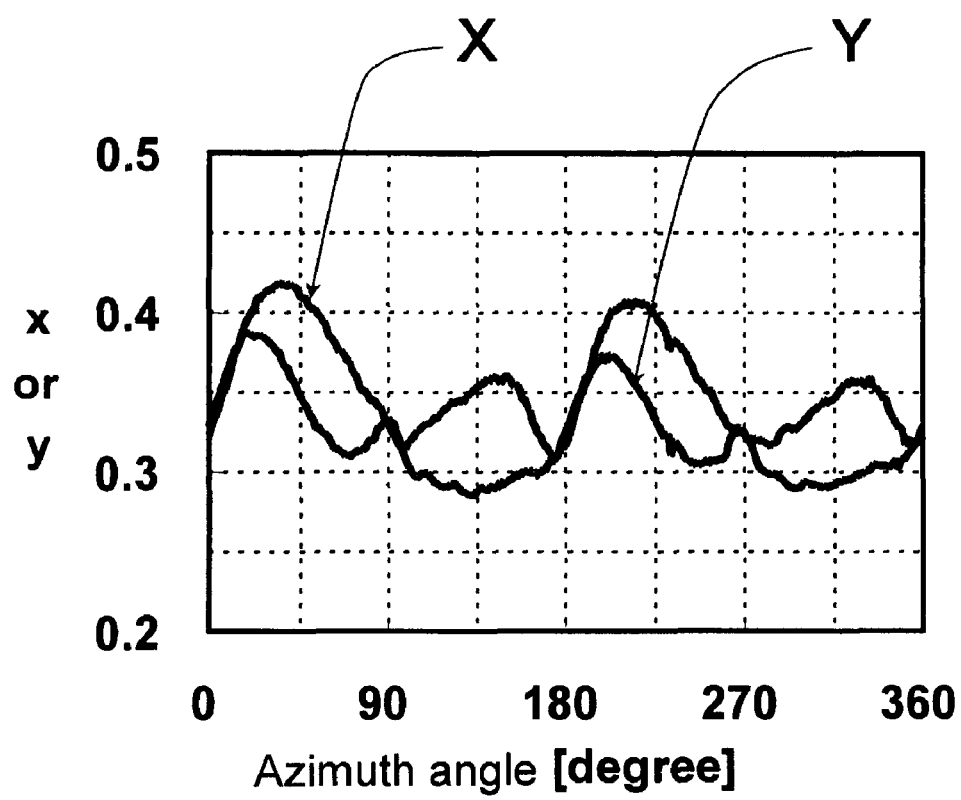
FIG. 7 is a graph showing measurement results of a change in color shift in accordance with a variation in the azimuth angle to a liquid crystal panel of Comparative Example 2.
Figure 8:
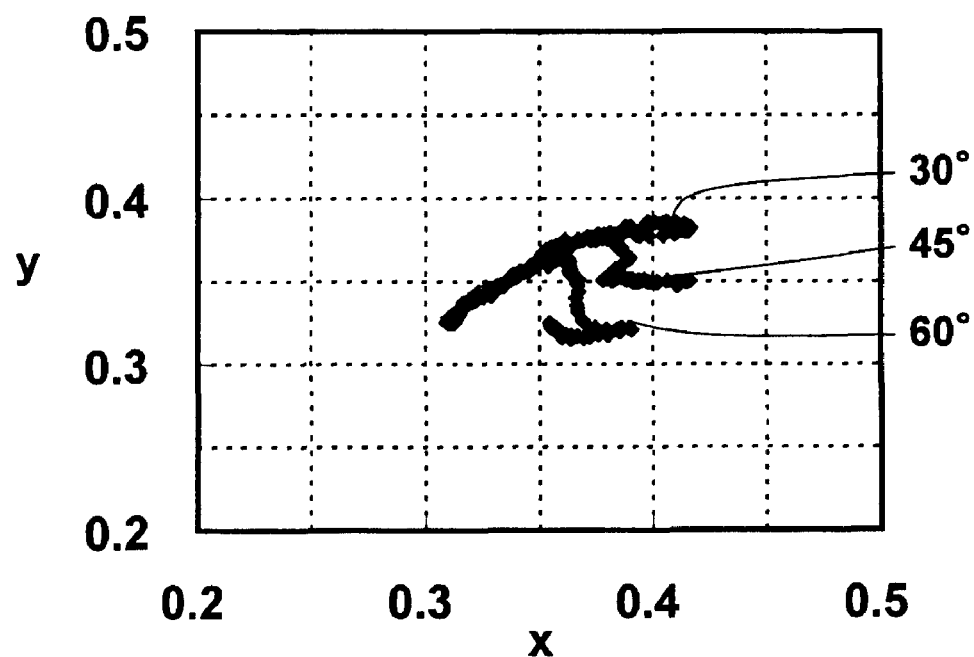
FIG. 8 is a graph showing measurement results of a change in color shift in accordance with a variation in the polar angle to the liquid crystal panel of Comparative Example 2.

FIG. 3 shows results of the X value and the Y value when the polar angle was fixed to 60 degrees and the azimuth angle was changed from 0 to 360 angles (in the same manner as in FIGS. 5 and 7 about Comparative Examples described below). FIG. 4 shows results of each of the X value and the Y value when the azimuth angle was fixed to 30 degrees, 45 degrees and 60 degrees, respectively, and the polar angle was changed from 0 to 90 angles (in the same manner as in FIGS. 6 and 8 about the Comparative Examples).

Comparative Example 1

A liquid crystal panel was produced in the same way as in Example 1 except that one of the optical compensation layers (3) was used instead of the optical compensation layer (1).

About the resultant liquid crystal panel, the XY chromaticity was measured under the same conditions as in Example 1. Results shown in FIGS. 5 and 6 were obtained. It was ascertained from the results that in the case of using, as optical compensation layers, a film having a reverse wavelength dispersive property (the optical compensation layers (2)) and a film having a normal wavelength dispersive property (the optical compensation layers (3)), a large color shift is generated.

Comparative Example 2

A liquid crystal panel was produced in the same way as in Example 1 except that two of the optical compensation layers (2) were used instead of two of the optical compensation layers (4).

About the resultant liquid crystal panel, the XY chromaticity was measured under the same conditions as in Example 1. Results shown in FIGS. 7 and 8 were obtained. It was ascertained from the results that in the case of using, as optical compensation layers, only films having a reverse wavelength dispersive property (the optical compensation layer (1) and the optical compensation layers (4)), a large color shift is generated.

What is claimed is:

1. A liquid crystal panel, comprising a liquid crystal cell, a first polarizer disposed on one surface side of the liquid crystal cell, a second polarizer disposed on the other surface side of the liquid crystal cell, and first and second optical compensation layers disposed between the first and second polarizers, wherein the liquid crystal cell satisfies a relationship of $0.8<\text{Re}[450]/\text{Re}[550]<1$, the first optical compensation layer satisfies relationships of an Nz coefficient is from 0.8 to 1.4 and $0.8<\text{Re}[450]/\text{Re}[550]<1$, and the second optical compensation layer satisfies relationships of $nx=ny>nz$ and $0.98<\text{Re}[450]/\text{Re}[550]<1.04$, the Nz coefficient is calculated from an expression of the Nz coefficient = $(nx-nz)/(nx-ny)$, and the Re[λ] is calculated from an expression of the $\text{Re}[\lambda]=(nx-ny)\times d$, and the nx represents the refractive index in the in-plane X axis direction (the axis direction along which the refractive index in the plane is the largest), the ny represents the refractive index in the in-plane Y axis direction (the in-plane direction orthogonal to the X axis direction), the nz represents the refractive index in the direction orthogonal to the X axis and Y axis directions, the d represents a thickness (nm), and the λ represents a wavelength.

2. The liquid crystal panel according to claim 1, wherein the first optical compensation layer is disposed between the first polarizer and the liquid crystal cell, and the second optical compensation layer is disposed between the second polarizer and the liquid crystal cell.

3. The liquid crystal panel according to claim 1, wherein the first polarizer is disposed on the viewing surface side of the liquid crystal cell.

4. The liquid crystal panel according to claim 1, wherein the liquid crystal cell is in a VA mode.

5. The liquid crystal panel according to claim 1, wherein the first optical compensation layer satisfies a relationship of $nx>ny\geq nz$.

6. The liquid crystal panel according to claim 1, wherein the first optical compensation layer comprises a cellulose-based polymer or a modified vinyl alcohol-based polymer.

7. The liquid crystal panel according to claim 1, wherein the second optical compensation layer comprises a norbornene-based polymer.

8. A liquid crystal display, comprising the liquid crystal panel as recited in claim 1.

* * * * *

UNITED STATES PATENT AND TRADEMARK OFFICE
CERTIFICATE OF CORRECTION

PATENT NO. : 8,228,471 B2
APPLICATION NO. : 12/521269
DATED : July 24, 2012
INVENTOR(S) : Junichi Nagase et al.

It is certified that error appears in the above-identified patent and that said Letters Patent is hereby corrected as shown below:

In the Specifications:

In Column 5, Line 43;
Change

"below is defined"

To be

--below are defined--

In Column 7, Line 44;
Change

"FIG. 2."

To be

--FIGS. 2(A) and (B).--

In Column 7, Line 51;
Change

"FIG. 2."

To be

--FIGS. 2(A) and (B).--

Signed and Sealed this
Sixteenth Day of April, 2013

Teresa Stanek Rea
*Acting Director of the United States Patent and Trademark Office*

CERTIFICATE OF CORRECTION (continued)
U.S. Pat. No. 8,228,471 B2

In Column 10, Line 7;
Change

"described bonding of"

To be

--described in bonding of--

In Column 15, Line 6;
Change

"described bonding of"

To be

--described in bonding of--